(12) United States Patent  
Iwamoto

(10) Patent No.: US 6,793,359 B2  
(45) Date of Patent: Sep. 21, 2004

(54) VEHICLE HEADLAMP

(75) Inventor: Miyoshi Iwamoto, Isehara (JP)

(73) Assignee: Ichikoh Industries, Ltd., Tokyo (JP)

( * ) Notice: Subject to any disclaimer, the term of this patent is extended or adjusted under 35 U.S.C. 154(b) by 24 days.

(21) Appl. No.: 10/310,992

(22) Filed: Dec. 6, 2002

(65) Prior Publication Data

US 2003/0123249 A1 Jul. 3, 2003

(30) Foreign Application Priority Data

Dec. 7, 2001 (JP) ........................................ 2001-374728

(51) Int. Cl.$^7$ .............................................. B60Q 1/06
(52) U.S. Cl. ............................ 362/39; 362/40; 362/43; 362/507; 362/515; 362/525; 362/528; 362/530; 362/531; 362/532; 362/420; 362/421; 362/425; 362/427
(58) Field of Search ............................. 362/39, 40, 43, 362/507, 459, 512, 515, 523, 525, 528, 529, 530, 532, 531, 420, 421, 425, 427

(56) References Cited

U.S. PATENT DOCUMENTS 5,270,906 A  * 12/1993 Kircher ...................... 362/523

FOREIGN PATENT DOCUMENTS

| GB | 2 337 321 A | 11/1999 |
|---|---|---|
| JP | 08-115604 A | 5/1996 |
| JP | 11-066913 A | 3/1999 |
| JP | 11-260115 A | 9/1999 |
| JP | 11-329011 A | 11/1999 |

* cited by examiner

Primary Examiner—Stephen Husar  
Assistant Examiner—Sharon Payne  
(74) Attorney, Agent, or Firm—Foley & Lardner LLP

(57) ABSTRACT

A transmission member is swingably connected respectively to a reflector and a nut member, about an axis substantially orthogonal to a tilting direction of the reflector and to an advancing and backward direction of the nut member. As a result, the transmission member, which forms a link of a link mechanism, converts the linear motion of the nut member into rotation motion and transmits the rotation motion to the reflector, and also adjusts a misalignment between the linear motion of the nut member and the rotation motion of the reflector. Accordingly, optical axis adjustment is carried out smoothly.

24 Claims, 8 Drawing Sheets

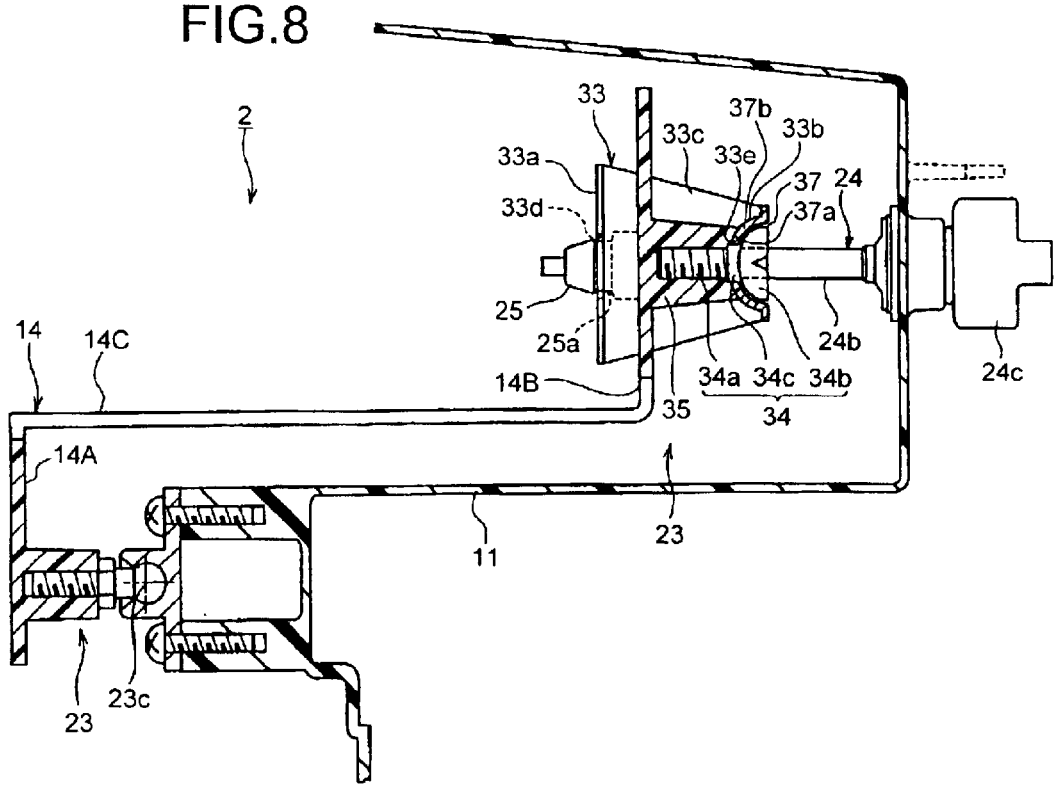
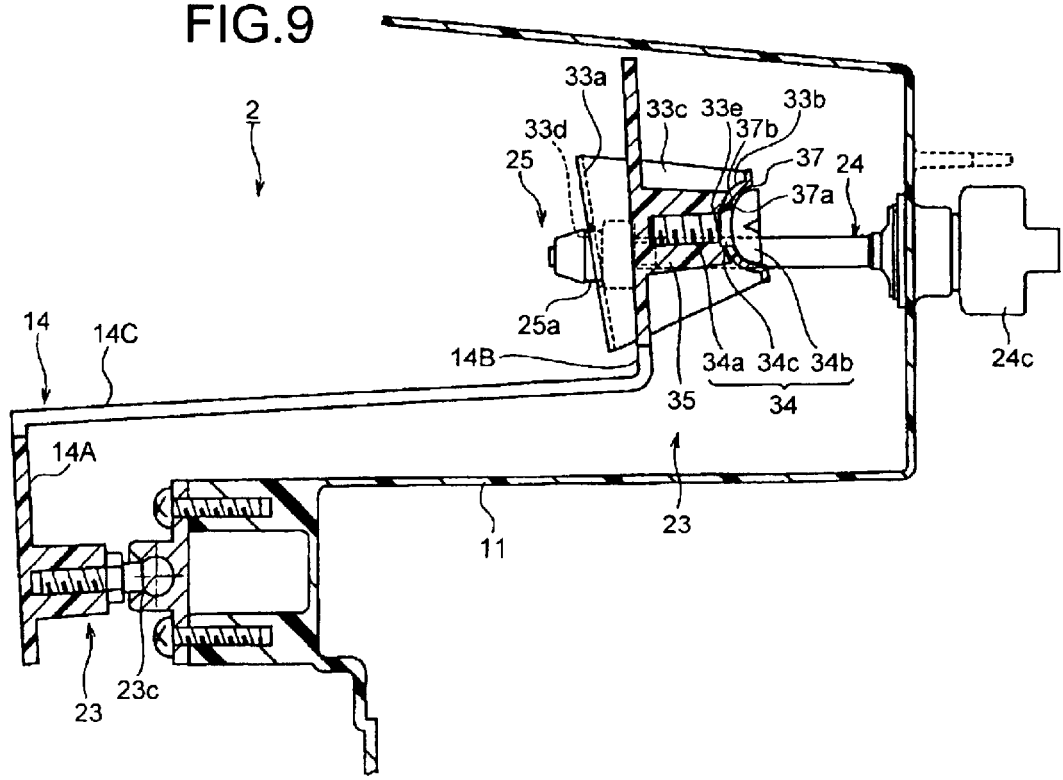

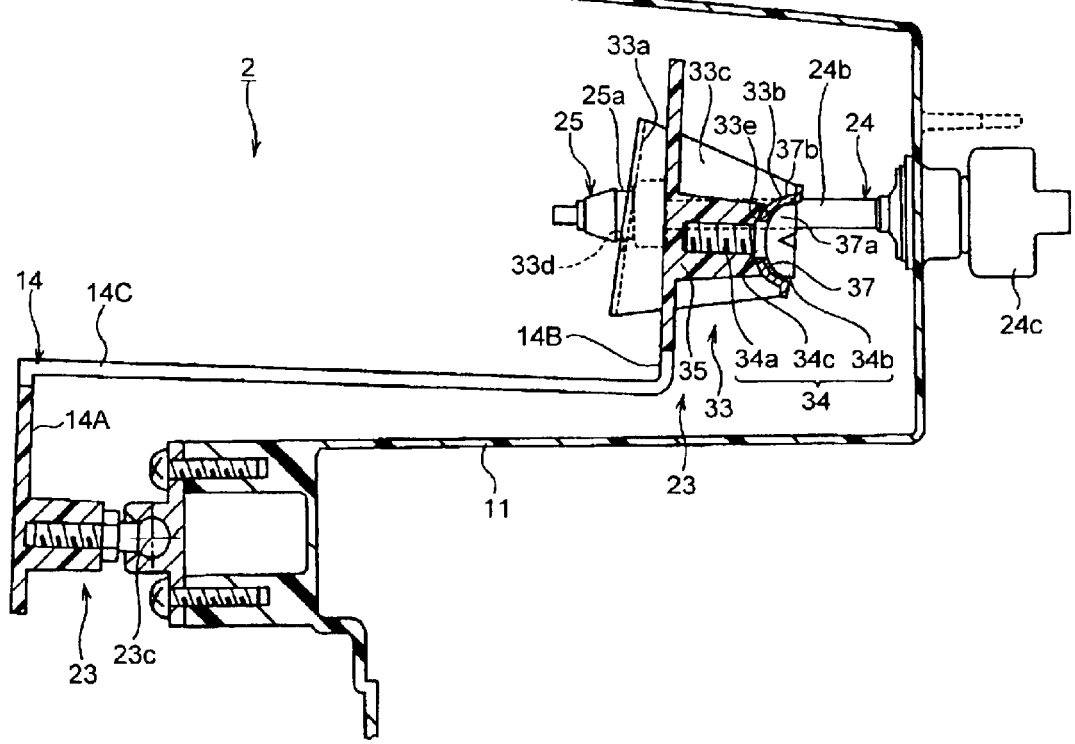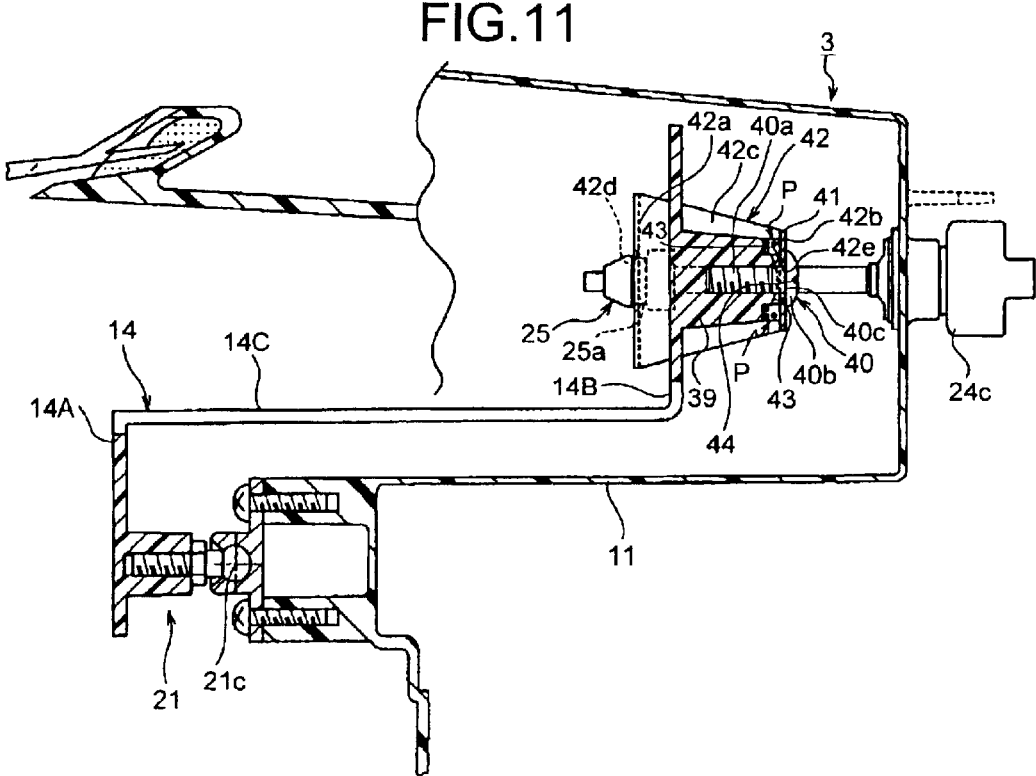

VEHICLE HEADLAMP

This application claims priority from Japanese Patent Application 2001-374728, filed Dec. 7, 2001 which is incorporated herein by reference in its entirety.

BACKGROUND OF THE INVENTION

1) Field of the Invention

The present invention relates to a vehicle headlamp in which optical axis adjustment is carried out smoothly. In the description, terms like back, front, vertical, and lateral indicate directions with respect to the vehicle.

2) Description of the Related Art

Vehicle headlamps having an optical axis adjustment mechanism have been described in, for example, Japanese Patent Applications Laid-Open Nos. H11-260115 and H11-329011.

The vehicle headlamps disclosed in these publications comprise a housing (1, 31) and a front lens (2, 32) forming a lamp chamber, a lamp bulb (5, 35A, 35B, 34, 52) housed in the lamp chamber, a reflector (3, 33, 31, 51) that reflects illumination light emitted from the lamp bulb (5, 35A, 35B, 34, 52) towards the front lens (2, 32) side, and an optical axis adjustment mechanism that supports the reflector (3, 33, 31, 51) on the housing (1, 31), so as to be able to adjust the optical axis.

The optical axis adjustment mechanism comprises, a ball joint (10, 40, 81, 82) that tiltably supports the reflector (3, 33, 31, 51) on the housing (1, 31), aiming screws (25, 26, 52, 53, 85, 86) rotatably supported on the housing (1, 31), and nut members (21, 22, 51, 52, 83, 84) mounted on screw portions of the aiming screws (25, 26, 52, 53, 85, 86), so as to be able to advance or retreat in the axial direction of the aiming screws (25, 26, 52, 53, 85, 86).

When the aiming screws (25, 26, 52, 53, 85, 86) are rotated, the nut members (21, 22, 51, 52, 83, 84) advance or retreat in the axial direction of the aiming screws (25, 26, 52, 53, 85, 86). Accompanying this, the reflector (3, 33, 31, 51) tilts vertically or laterally, about the ball joint (10, 40, 81, 82), with respect to the housing (1, 31). Thereby, the optical axis adjustment is carried out.

In the conventional vehicle headlamp, it is not possible to carry out the optical axis adjustment smoothly, so a vehicle headlamp in which it is possible to smoothly carry out the optical axis adjustment is in demand.

SUMMARY OF THE INVENTION

In the vehicle headlamp according to this invention, a transmission member is respectively connected swingably to a reflector and a nut member about an axis substantially orthogonal to the tilting direction of the reflector and to the advancing and backward direction of the nut member.

As a result, the transmission member provided between the reflector and the nut member forms a link in a link mechanism. Accordingly, the transmission member can convert a linear motion of the nut member to a rotation motion, and transmit the rotation motion to the reflector, and can also adjust a misalignment between the linear motion of the nut member and the rotation motion of the reflector. As a result, the optical axis adjustment can be carried out smoothly.

The reflector may be an integrated-type reflector in which a first reflector and a second reflector are provided integrally, and it is effective when a distance between a tilting fulcrum of the reflector (ball joint) and a transfer fulcrum of the nut member (a mounting point of the nut member and a screw portion of an aiming screw) is long, and an error between the linear motion of the nut member and the rotation motion of the reflector is large.

According to this invention, a front lens is a slant type front lens, in which the front lens largely inclines vertically or laterally, and the reflector is an integral type reflector in which the first reflector and the second reflector are provided integrally, in two stages back and front. It is further effective when the tilting fulcrum of the reflector and the transfer fulcrum of the nut member are not located on one plane orthogonal to the aiming screw, but shifted back and front, thereby the distance between the tilting fulcrum of the reflector and the transfer fulcrum of the nut member becomes long, and the error between the linear motion of the nut member and the rotation motion of the reflector is large.

These and other objects, features and advantages of the present invention are specifically set forth in or will become apparent from the following detailed descriptions of the invention when read in conjunction with the accompanying drawings.

BRIEF DESCRIPTION OF THE DRAWINGS

FIG. 8 is an enlarged view that shows main parts of a vehicle headlamp according to the second embodiment of the present invention;

FIG. 9 is an enlarged view that shows a downward tilting state of a reflector of the vehicle headlamp according to the second embodiment;

FIG. 10 is an enlarged view that shows an upward tilting state of the reflector of the vehicle headlamp according to the second embodiment;

FIG. 11 is an enlarged view that shows main parts of a vehicle headlamp according to the third embodiment of the present invention;

DETAILED DESCRIPTIONS

Figure 1:
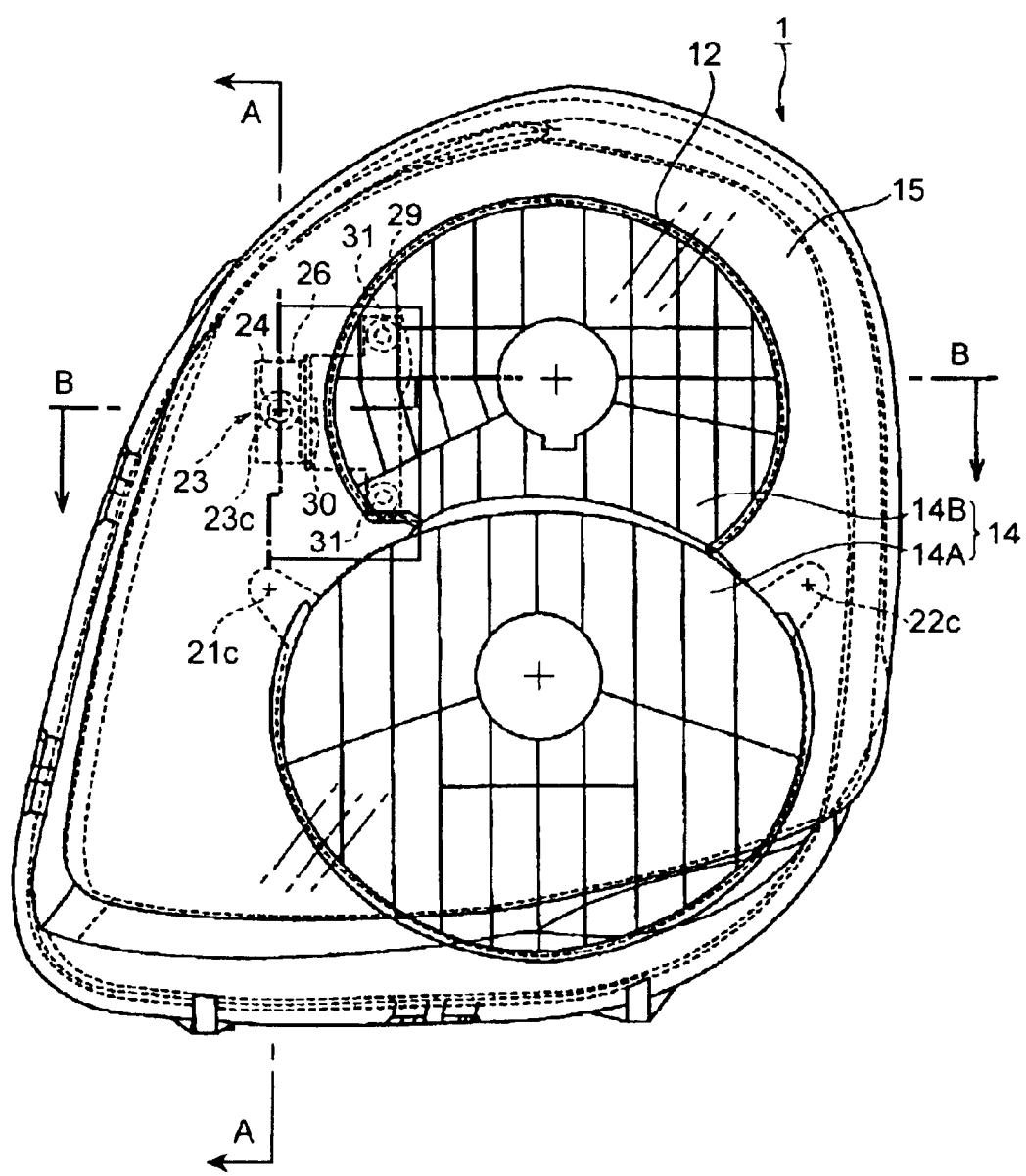
FIG. 1 is a front elevational view that shows a vehicle headlamp according to the first embodiment of the present invention.

Three exemplary embodiments of the vehicle headlamp according to the present invention will be explained, with reference to the accompanying drawings.

FIGS. 1 to 7 show a vehicle headlamp 1 according to the first embodiment of the present invention. The vehicle headlamp 1 is a quad headlamp, and comprises a housing 11 and a front lens 12 forming a lamp chamber 13 between the housing 11 and the front lens, a reflector 14 provided in the lamp chamber 13, and an inner panel 15 that hides the end portions of the housing 11 and the reflector 14 and the gap between them.

The housing 11 is fixed to the vehicle frame, via a mounting flange (not shown). A fitting groove 16 is provided on the rim of an opening on the front face of the housing 11.

Figure 2:
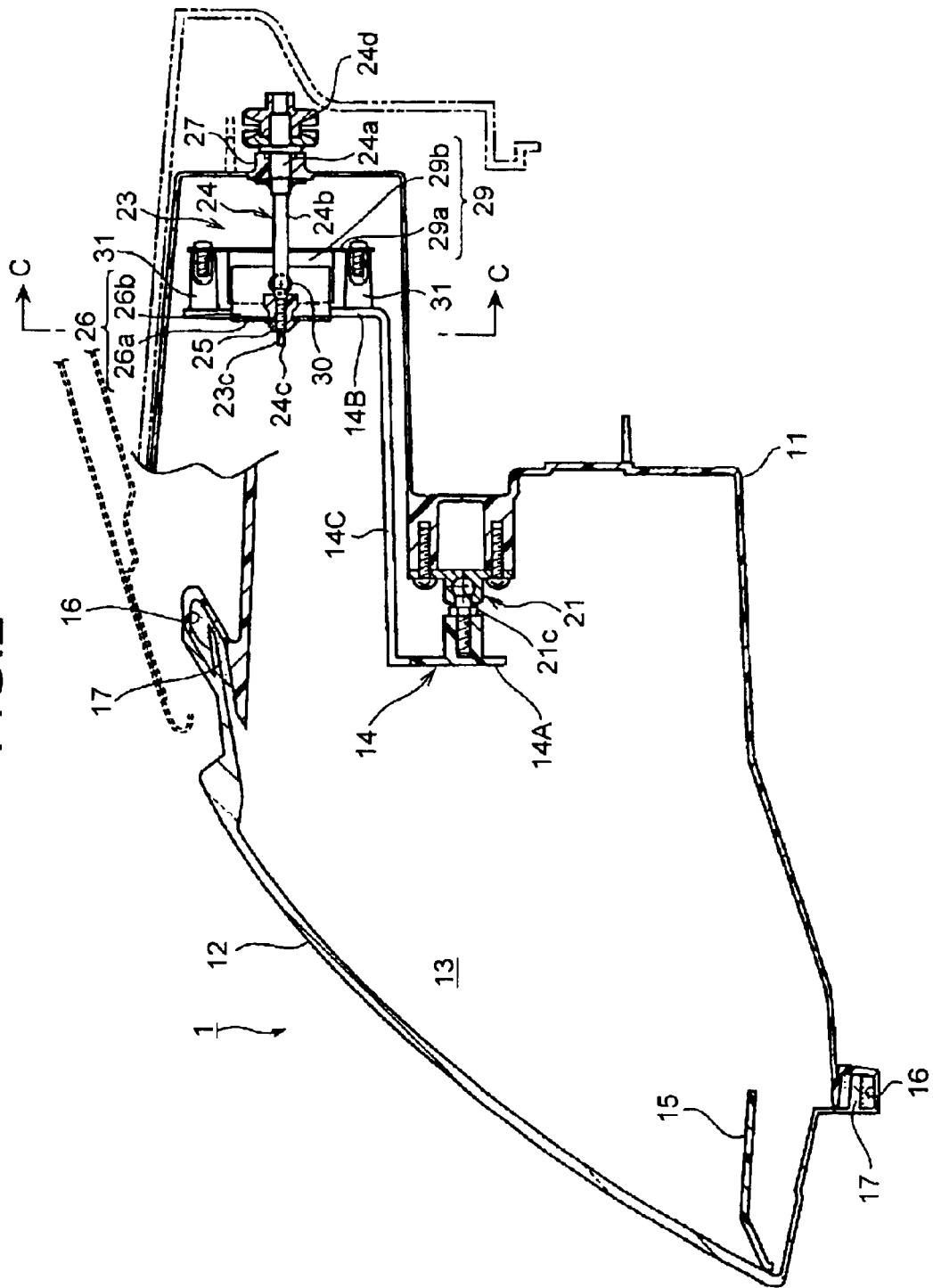
FIG. 2 is a cross sectional view taken along a line A—A in FIG. 1.
Figure 3:
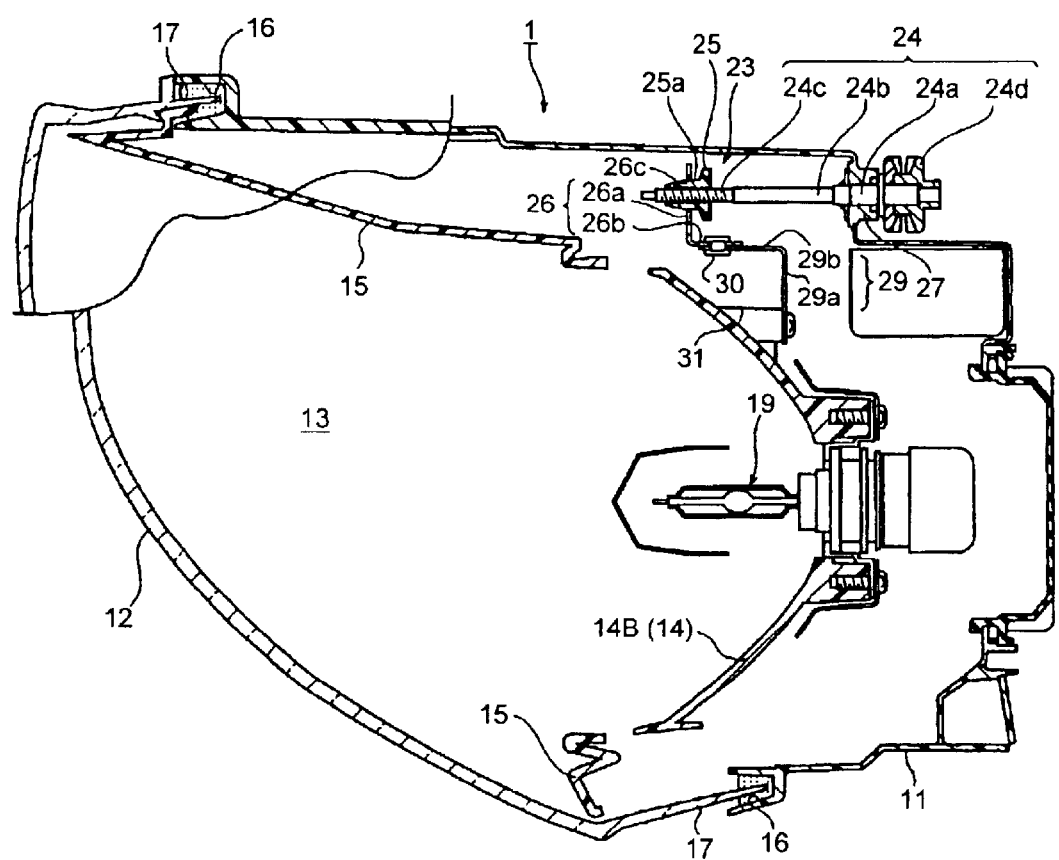
FIG. 3 is a cross sectional view taken along a line B—B in FIG. 1.

The front lens 12 is formed of a transparent lens. A leg portion 17 extending rearwards is provided on the rim of the front lens 12. The leg portion 17 is inserted in and fixed to the fitting groove 16 on the housing 11, to form the lamp chamber 13 between the housing 11 and the front lens 12. As shown in FIG. 1, the headlamp 1 is oblong, in view of the design. Therefore, the front lens 12 is a slant type front lens, such that the front lens largely inclines vertically, as shown in FIG. 2, and largely inclines laterally, as shown in FIG. 3.

The reflector 14 is an integral type reflector, in which two reflectors 14A and 14B are integrally formed. In other words, the reflector 14 has a construction such that a first reflector 14A on a lower side, to which a lamp bulb (not shown) for high beams is fitted, and a second reflector 14B on an upper side, to which a lamp bulb 19 for low beams is fitted, are vertically provided adjacent to each other via a connecting portion 14C, in two stages back and front. The reflector 14 is supported on the housing 11 via an optical axis adjustment mechanism, so that the optical axis can be adjusted at the time of assembly of the vehicle frame.

The optical axis adjustment mechanism comprises a ball joint 21 that constitutes a tilting fulcrum 21c, a lateral optical axis adjustment unit (not shown) that constitutes a transfer fulcrum 22c that causes the reflector 14 to tilt in the lateral direction about the tilting fulcrum 21c, and a vertical optical axis adjustment unit 23 that constitutes a transfer fulcrum 23c that causes the reflector 14 to tilt in the vertical direction about the tilting fulcrum 21c. The optical axis adjustment mechanism has a support structure favorable against vibrations, since it supports whole of the reflector 14. In other words, the optical axis adjustment mechanism supports the reflector 14 by the ball joint 21 and the lateral optical axis adjustment unit in the lower-side first reflector 14A, while supporting the reflector 14 by the vertical optical axis adjustment unit 23 in the upper-side second reflector 14B. As a result, it is avoided that either one of the reflectors 14A and 14B is out of support to have a structure unfavorable against vibrations.

The vertical optical axis adjustment unit 23 comprises an aiming screw 24 (hereinafter may be referred to as a screw 24), a nut member 25, and a transmission member 26.

The aiming screw 24 is mounted on a cylindrical portion 27 of the housing 11 from the rear side via an O-ring. The aiming screw 24 comprises, a rotation support portion 24a rotatably held by the cylindrical portion 27, a screw body 24b integral with the rotation support portion 24a, a screw portion 24c provided at the front end of the screw body 24b, and an annular gear 24d integrally provided at the rear end of the screw body 24b. The screw body 24b can be rotated via the annular gear 24d by a tool such as a driver.

The nut member 25 is screwed together to the screw portion 24c of the aiming screw 24, so that when the screw 24 rotates, the nut member 25 advances or retreats back and front along the axial direction of the screw 24. An annular groove 25a is provided about the nut member 25. As a result, a front step 25b, a rear step 25c, and a cylindrical bottom 25d are formed in the nut member 25, via the annular groove 25a.

Figure 6:
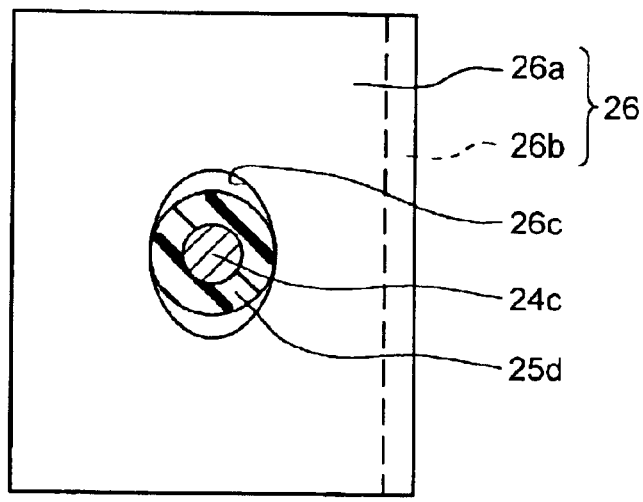
FIG. 6 is a cross sectional view taken along a line C—C in FIG. 2.

The transmission member 26 comprises a bracket, as shown in FIG. 3, formed in an L shape as seen from above. In other words, the transmission member 26 comprises a flat mounting portion 26a crossing the screw 24, and a flat junction 26b being substantially parallel to the screw 24. A hole 26c is provided in the mounting portion 26a. The hole 26c is formed in an elliptical shape, short in the lateral direction and long in the vertical direction, as shown in FIG. 6, so that the transmission member 26 can swing in the direction of a transfer error (in the vertical direction) between the rotation motion of the reflector 14 and the linear motion of the nut member 25, while the nut member 25 does not rotate together with the aiming screw 24. Since the bottom 25d of the nut member 25 is fitted into the hole 26c in the mounting portion 26a of the transmission member 26 via the annular groove 25a, so that the transmission member 26 can swing in the tilting direction of the reflector 14, while the nut member 25 does not rotate together with the aiming screw 24, the nut member 25 and the transmission member 26 are swingably connected together.

As shown in FIG. 3, a bracket 29 formed in an L shape, as seen from above, is fixed to the second reflector 14B of the reflector 14. The bracket 29 comprises a flat fixed portion 29a crossing the screw 24, and a flat connecting portion 29b, substantially parallel to the screw 24. The fixed portion 29a is fixed by a screw to a pair of bosses 31 provided in a protruding condition on the backside of the reflector 14. The connecting portion 29b is provided with a rotation pivot 30. The rotation pivot 30 is arranged orthogonal to the direction of a transfer error (in the vertical direction) between the rotation motion of the reflector 14 and the linear motion of the nut member 25, so that the transmission member 26 can swing in the direction of a transfer error (in the vertical direction) between the rotation motion of the reflector 14 and the linear motion of the nut member 25. Since the connecting portion 29b in the bracket 29 of the reflector 14 is fitted to the connecting portion 26b of the transmission member 26 via the rotation pivot 30, the reflector 14 and the transmission member 26 are swingably connected.

The transmission member 26 is respectively connected swingably to the reflector 14 and the nut member 25, about the axis orthogonal to the tilting direction of the reflector 14 and the advancing and backward direction of the nut member 25, so that the linear motion of the nut member 25 is converted to the rotation motion and transmitted to the reflector 14, and an error between the linear motion of the nut member 25 and the rotation motion of the reflector 14 is corrected.

Figure 4:
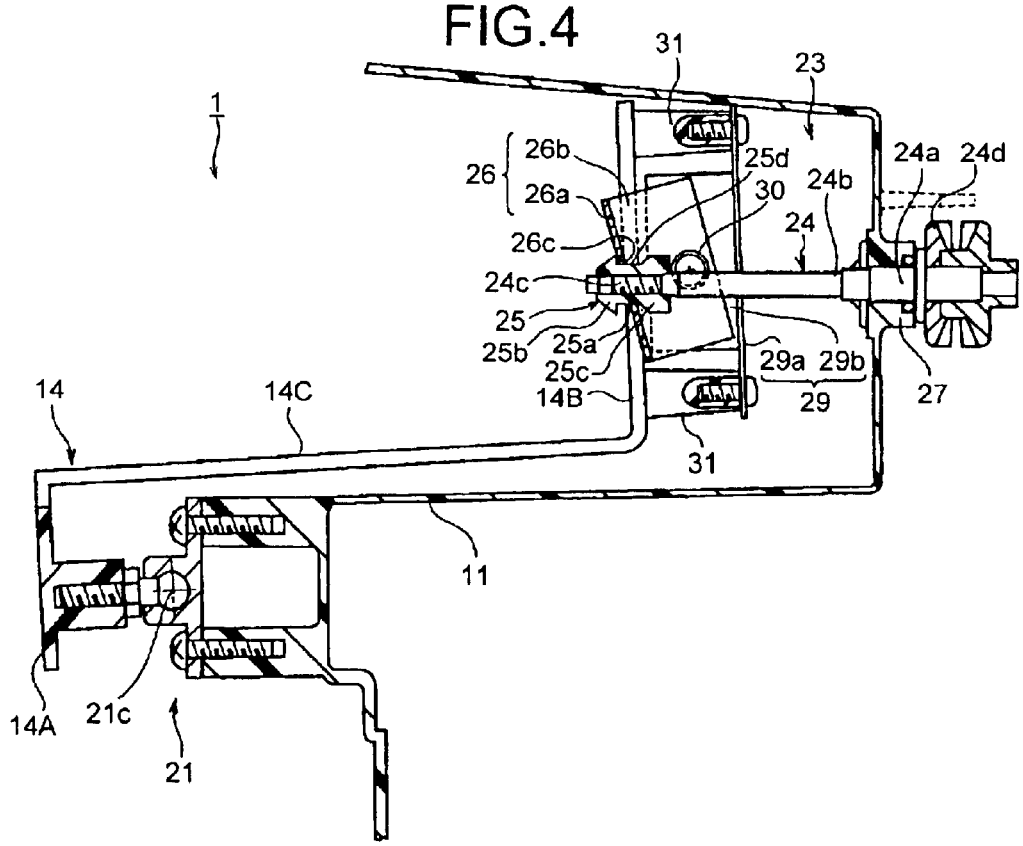
FIG. 4 is an enlarged view that shows a downward tilting state of a reflector of the vehicle headlamp according to the first embodiment.
Figure 7:
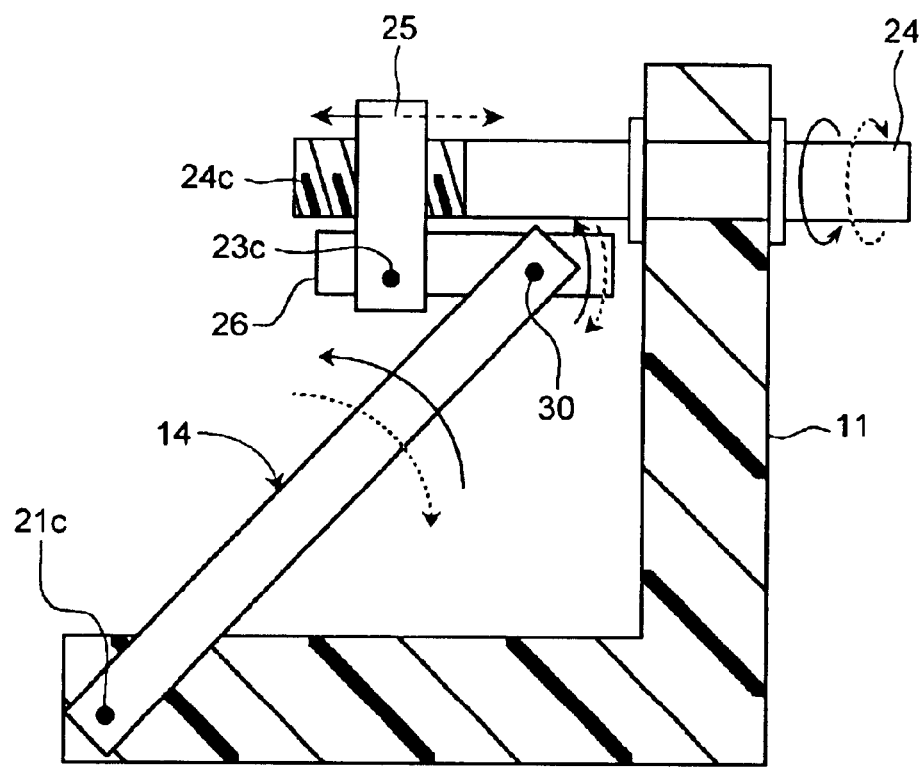
FIG. 7 is a schematic diagram that illustrates the outline of the present invention.

Operation of the vehicle head lamp 1 according to the first embodiment will now be explained. As schematically shown in FIG. 7, the aiming screw 24 of the vertical optical axis adjustment unit 23 is rotated in a direction of a solid arrow. Then, the nut member 25 is advanced through the screw in the direction of the solid arrow. Accompanying this, the transmission member 26 swings in a direction of the solid arrow, about the transfer fulcrum 23c (a place where the nut member 25 is mounted on the screw portion 24c of the aiming screw 24, and a place where the bottom 25d of the nut member 25 is fitted into the hole 26c of the transmission member 26). Further, the reflector 14 tilts in a direction of the solid arrow, about the tilting fulcrum 21c, that is, about an axis (not shown) connecting the tilting fulcrum 21c at the center of the ball joint 21 and the transfer fulcrum 22c of the lateral optical axis adjustment unit. As a result, the reflecting surface of the reflector 14 tilts downwards, as shown in FIG. 4.

Figure 5:
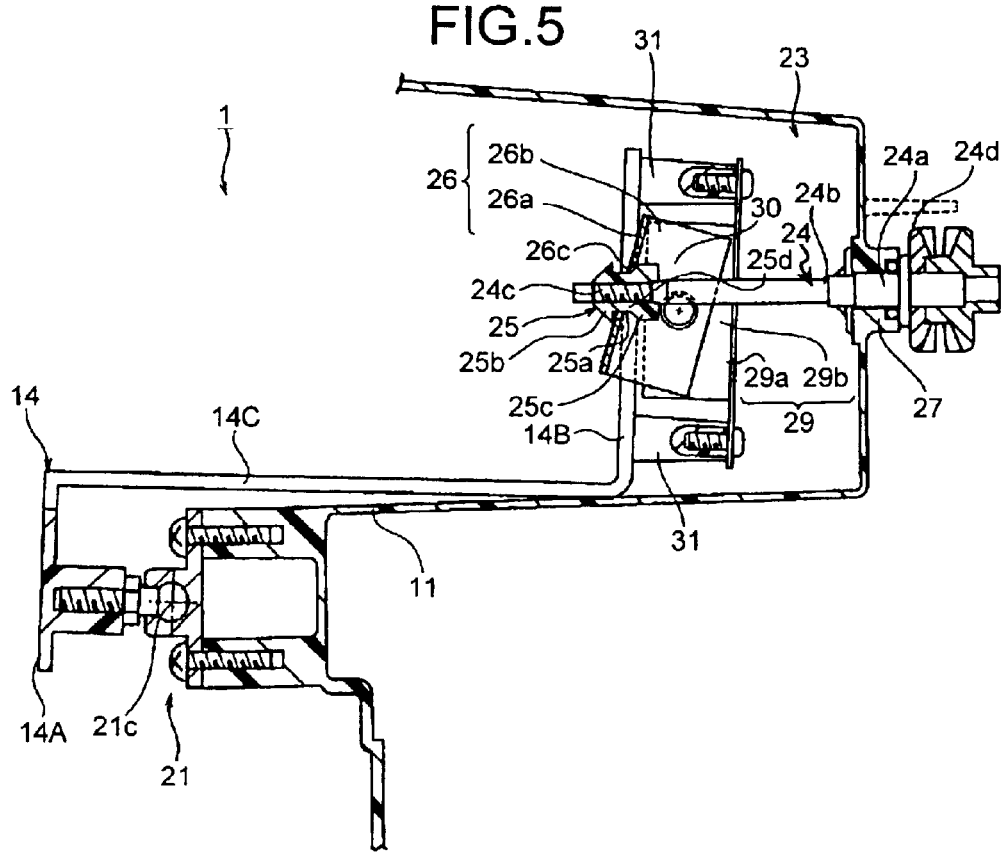
FIG. 5 is an enlarged view that shows an upward tilting state of the reflector of the vehicle headlamp according to the first embodiment.

As schematically shown in FIG. 7, the aiming screw 24 of the vertical optical axis adjustment unit 23 is rotated in a direction of a broken arrow. Then, the nut member 25 is made to retreat through the screw in a direction of the broken arrow. Accompanying this, the transmission member 26 swings in a direction of the broken arrow, about the transfer fulcrum 23c. Further, the reflector 14 swings about the tilting fulcrum 21c via the rotation pivot 30 in a direction of the broken arrow. As a result, the reflecting surface of the reflector 14 tilts upwards, as shown in FIG. 5.

The vehicle headlamp 1 according to the first embodiment achieves following effects. In the vehicle headlamp 1, since the transmission member 26 provided between the reflector 14 and the nut member 25 forms a link of a link mechanism as schematically shown in FIG. 7, the transmission member 26 can convert the linear motion of the nut member 25 into a rotation motion and transmit the rotation motion to the reflector 14, and can adjust a misalignment between the linear motion of the nut member 25 and the rotation motion of the reflector 14. As a result, in the vehicle headlamp 1, optical axis adjustment can be carried out smoothly, without distorting the reflector 14.

Particularly, as in the first embodiment, the front lens 12 is a slant type front lens in which the front lens 12 largely inclines vertically and laterally. Further, the reflector 14 is an integral reflector in which the first reflector 14A and the second reflector 14B are provided integrally, in two stages back and front. When a vehicle headlamp is used, in which the tilting fulcrum 21c of the reflector 14 an the transfer fulcrum 23c of the nut member 25 are located not on a plane orthogonal to the aiming screw 24 but shifted back and front as schematically shown in FIG. 7, the distance between the tilting fulcrum 21c of the reflector 14 and the transfer fulcrum 23c of the nut member 25 becomes long, and an error between the linear motion of the nut member 25 and the rotation motion of the reflector 14 becomes large. In such a vehicle headlamp, the vehicle headlamp 1 according to the first embodiment is more effective.

That is, when the ball joint 21 and the vertical optical axis adjustment unit 23 are arranged back and front, in the vertical optical axis adjustment unit 23, the direction of the rotation motion of the reflector 14 does not follow the advancing and backward direction of the nut member 25, and the transfer error between these becomes large. In the vehicle headlamp 1, however, even if the transfer error between the rotation motion of the reflector 14 about the tilting fulcrum 21c and the linear motion of the nut member 25 becomes large, the transmission member 26 acts so as to correct the transfer error between the rotation motion of the reflector 14 and the linear motion of the nut member 25. Therefore, the optical axis can be smoothly adjusted.

In the vehicle headlamp 1, the whole reflector 14 is covered and supported by the optical axis adjustment mechanism. In other words, the optical axis adjustment mechanism in this vehicle headlamp 1 supports the reflector 14 in the lower-side first reflector 14A by the ball joint 21 and the lateral optical axis adjustment unit, and on the other hand, in the upper-side second reflector 14B, by the vertical optical axis adjustment unit 23. Therefore, in the vehicle headlamp 1, even if the reflector 14 is an integral type reflector in which two reflectors are provided in two stages back and front adjacent to each other, favorable and appropriate optical axis adjustment can be carried out against vibrations.

In the vehicle headlamp 1, since the annular groove 25a is formed in the nut member 25, and the elliptical hole 26c is provided in the transmission member 26, by fitting the bottom 25d of the nut member 25 into the hole 26c of the transmission member 26 via the annular groove 25a, the transmission member 26 can be swingably connected to the nut member 25, with a relatively simple structure.

In the vehicle headlamp 1, since the transmission member 26 is swingably connected to the bracket 29 via the rotation pivot 30, the transmission member 26 can be swingably connected to the reflector 14, with a relatively simple structure.

Since the vehicle headlamp 1 uses the L-shaped transmission member 26 and the bracket 29, the transmission member 26 and the bracket 29 can be manufactured by folding, without requiring the drawing process, and hence the manufacturing cost can be reduced.

FIGS. 8 to 10 show a vehicle headlamp 2 according to a second embodiment of the present invention. In the figures, the same reference symbols as in FIGS. 1 to 7 denote the same elements.

In the vehicle headlamp 2 according to the second embodiment, a transmission member 33 is swingably connected to the nut member 25 and the reflector 14 via a bracket 34.

The transmission member 33 comprises a flat mounting portion 33a crossing the aiming screw 24, a flat connecting portion 33c substantially parallel to the aiming screw 24, and a dome-shaped sliding portion 33b. A hole 33d is provided in the mounting portion 33a. The hole 33d is formed in an elliptical shape, short in the lateral direction and long in the vertical direction, as in the hole 26c of the transmission member 26 in the first embodiment, so that the transmission member 33 can swing in the direction of a transfer error (in the vertical direction) between the rotation motion of the reflector 14 and the linear motion of the nut member 25, while the nut member 25 does not rotate together with the aiming screw 24 (see FIG. 6).

The bottom 25d of the nut member 25 is fitted into the hole 33d in the mounting portion 33a of the transmission member 33 via the annular groove 25a, so that the transmission member 33 can swing in the tilting direction of the reflector 14, while the nut member 25 does not rotate together with the aiming screw 24. As a result, the nut member 25 and the transmission member 33 are swingably connected together.

The bracket 34 is a screw comprising a screw portion 34a, a spacer 34c, and a head 34b. Hereinafter, the bracket 34 is referred to as a screw 34. The screw portion 34a of the screw 34 is screwed into a boss 35 provided on the backside of the reflector 14 (second reflector 14B) and fixed thereto. As a result, the screw 34 is fixed to the reflector 14.

A concave spherical surface 37a and a convex spherical surface 37b are formed on the opposing surfaces of the boss 35 of the reflector 14 and the head 34b of the screw 34. A rotational sliding guide groove 37 is formed between the concave spherical surface 37a and the convex spherical surface 37b. In other words, the rear end 37a of the boss 35 of the reflector 14 is formed in a concave spherical shape. On the other hand, the front face 37b of the head 34b of the screw 34 at a position opposite to the rear end 37a, separated by the spacer 34c and the sliding portion 33b, is formed in a convex spherical shape along the rear end 37a.

The sliding portion 33b of the transmission member 33 protrudes substantially hemispherically, so as to face the mounting portion 33a. An insertion hole 33e is provided in the sliding portion 33b. This insertion hole 33e is formed with a diameter larger than the spacer 34c, at least along the direction of a transfer error (in the vertical direction) between the rotation motion of the reflector 14 and the linear motion of the nut member 25, so that the transmission member 33 can swing in the direction of a transfer error (in the vertical direction) between the rotation motion of the reflector 14 and the linear motion of the nut member 25.

Since the spacer 34c of the screw 34 is inserted into the insertion hole 33e of the sliding portion 33b in the transmission member 33, and the sliding portion 33b of the transmission member 33 is swingably mounted between the concave spherical surface 37a of the boss 35 of the reflector 14 and the convex spherical surface 37b of the head 34b of the screw 34, via the rotational sliding guide groove 37, the reflector 14 and the transmission member 33 can be swingably connected.

With such a configuration, when the aiming screw 24 of the vertical optical axis adjustment unit 23 is rotated to advance the nut member 25, as shown in FIG. 9, the transmission member 33 transmits the advancing motion of the nut member 25 to the reflector 14, while correcting a transfer error between the rotation motion of the reflector 14 and the linear motion of the nut member 25, thereby the reflecting surface of the reflector 14 tilts downwards. On the other hand, when the aiming screw 24 of the vertical optical axis adjustment unit 23 is rotated in the reverse direction, to cause the nut member 25 to retreat, as shown in FIG. 10, the transmission member 33 transmits the retreating motion of the nut member 25 to the reflector 14, while correcting a transfer error between the rotation motion of the reflector 14 and the linear motion of the nut member 25, thereby the reflecting surface of the reflector 14 tilts upwards.

The vehicle headlamp 2 according to the second embodiment achieves substantially the same action and effects as those of the vehicle headlamp 1 according to the first embodiment. Particularly, in the vehicle headlamp 2 according to the second embodiment, since the sliding member 33b of the transmission member 33 is swingably mounted between the concave spherical surface 37a of the boss 35 of the reflector 14 and the convex spherical surface 37b of the head 34b of the screw 34, via the rotational sliding guide groove 37, the transmission member 33 can be swingably connected to the reflector 14, with a relatively simple structure.

Figure 12:
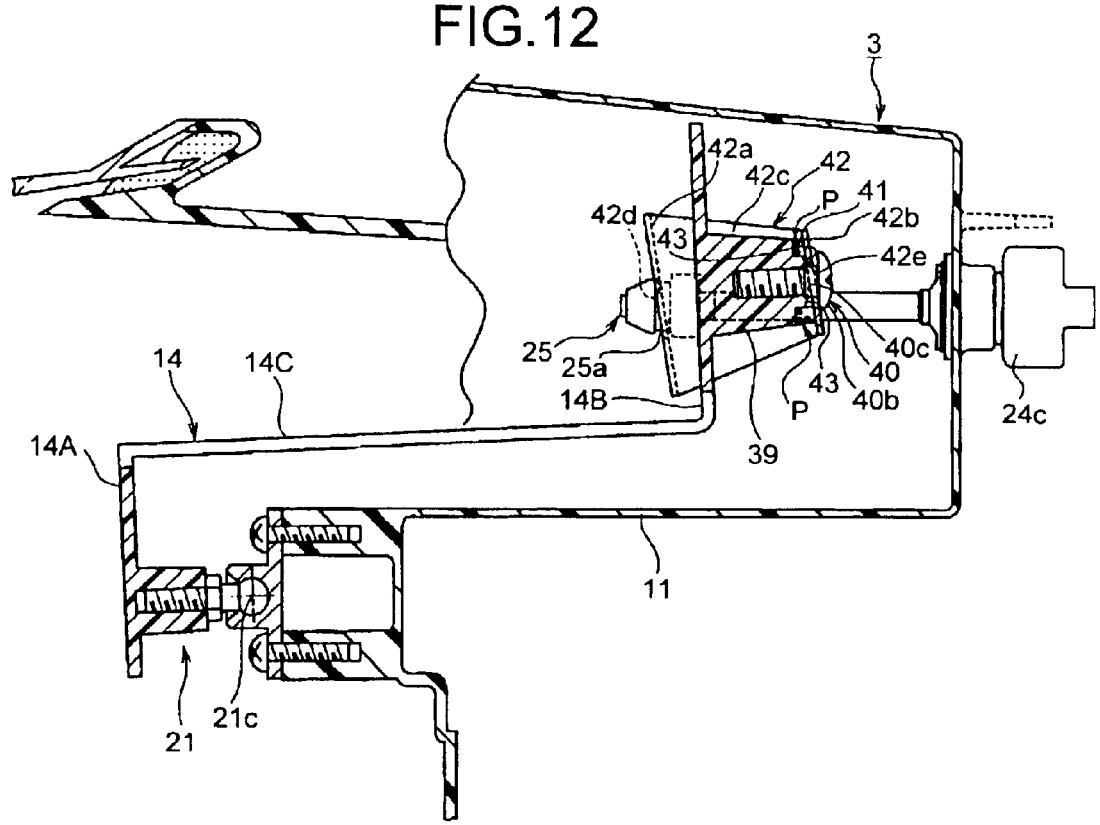
FIG. 12 is an enlarged view that shows a downward tilting state of a reflector of the vehicle headlamp according to the third embodiment.
Figure 13:
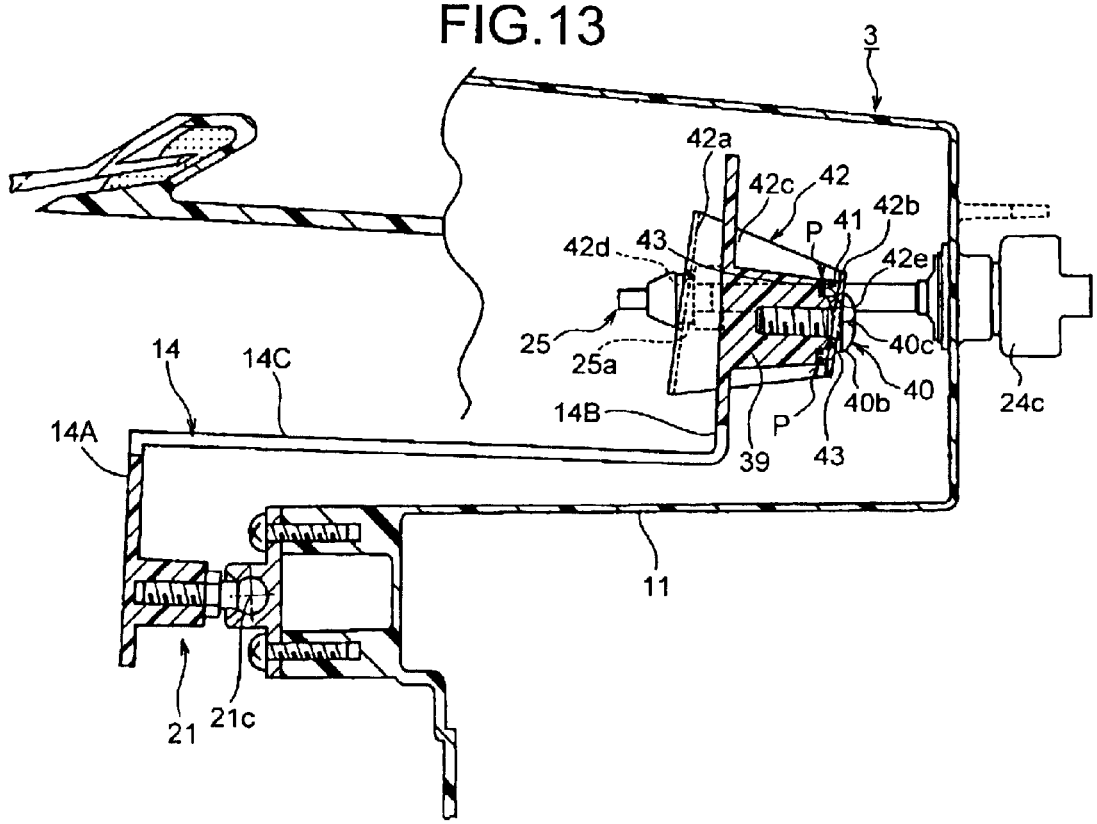
FIG. 13 is an enlarged view that shows an upward tilting state of the reflector of the vehicle headlamp according to the third embodiment.

FIGS. 11 to 13 show a vehicle headlamp 3 according to a third embodiment of the present invention. In the figures, the same reference symbols as in FIGS. 1 to 10 denote the same elements.

In the vehicle headlamp 3, a transmission member 42 is swingably connected to the nut member 25 and the reflector 14 via a bracket 40.

The transmission member 42 comprises a flat first mounting portion 42a and a flat second mounting portion 42b, respectively crossing the aiming screw 24, and a connecting portion 42c substantially parallel to the aiming screw 24. The first mounting portion 42a is provided with a hole 42d. The hole 42d is formed, as in the hole 26c of the transmission member 26 in the first embodiment, and the hole 33d of the transmission portion 33 in the second embodiment, in an elliptical shape, short in the lateral direction and long in the vertical direction (see FIG. 6), so that the transmission member 42 can swing in the direction of a transfer error (in the vertical direction) between the rotation motion of the reflector 14 and the linear motion of the nut member 25, while the nut member 25 does not rotate together with the aiming screw 24.

Since the bottom 25d of the nut member 25 is fitted into the hole 42d in the first mounting portion 42a of the transmission member 42 via the annular groove 25a, so that the transmission member 42 can swing in the tilting direction of the reflector 14, while the nut member 25 does not rotate together with the aiming screw 24, the nut member 25 and the transmission member 42 are swingably connected together.

The bracket 40 is a screw comprising a screw portion 40a, a spacer 40c, and a head 40b. Hereinafter, the bracket 40 is referred to as a screw 40. The screw portion 40a of this screw 40 is screwed into a boss 39 provided on the backside of the reflector 14 (second reflector 14B) and fixed thereto. As a result, the screw 40 is fixed to the reflector 14.

A swingable guide protrusion 43 in a convex spherical shape and a flat surface 44 are formed on the opposing surfaces of the boss 39 of the reflector 14 and the head 40b of the screw 40. An annular groove 41 is formed between the swingable guide protrusion 43 in a convex spherical shape and the flat surface 44. In other words, the front face 44 of the head 40b of the screw 40 is formed in a flat shape, and on the other hand, the rear end 43 of the boss 39 of the reflector 14, located at a position facing the front face 44 separated by the spacer 40c and the second mounting portion 42b, is formed in a convex spherical shape along the front face 44.

A hole 42e is provided in the second mounting portion 42b of the transmission member 42. The hole 42e is formed with a diameter larger than the spacer 40c, at least along the direction of a transfer error (in the vertical direction) between the rotation motion of the reflector 14 and the linear motion of the nut member 25, so that the transmission member 42 can swing in the direction of a transfer error (in the vertical direction) between the rotation motion of the reflector 14 and the linear motion of the nut member 25.

The spacer 40c of the screw 40 is fitted into the hole 42e in the second mounting portion 42b of the transmission member 42 via the annular groove 41, and the second mounting portion 42b of the transmission member 42 is swingably mounted between the swingable guide protrusion 43 of the boss 39 of the reflector 14 and the flat surface 44 of the head 40b of the screw 40, and a packing P is intervened as a resilient member between the swingable guide protrusion 43 and the second mounting portion 42b. As a result, the reflector 14 and the transmission member 42 are swingably connected to each other.

With such a configuration, when the aiming screw 24 of the vertical optical axis adjustment unit 23 is rotated to advance the nut member 25, as shown in FIG. 12, the transmission member 42 transmits the advancing motion of the nut member 25 to the reflector 14, while correcting a transfer error between the rotation motion of the reflector 14 and the linear motion of the nut member 25, thereby the reflecting surface of the reflector 14 tilts downwards. On the other hand, when the aiming screw 24 of the vertical optical axis adjustment unit 23 is rotated in the reverse direction, to cause the nut member 25 to retreat, as shown in FIG. 13, the transmission member 42 transmits the retreating motion of the nut member 25 to the reflector 14, while correcting a transfer error between the rotation motion of the reflector 14 and the linear motion of the nut member 25, thereby the reflecting surface of the reflector 14 tilts upwards.

The vehicle headlamp 3 according to the third embodiment achieves substantially the same action and effects as those of the vehicle headlamps according to the first and second embodiments. Particularly, in the vehicle headlamp 3 according to the third embodiment, since the second mounting portion 42b of the transmission member 42 is swingably mounted via the annular groove 41 between the swingable guide protrusion 43 of the boss 39 of the reflector 14 and the flat surface 44 of the head 40b of the screw 40, via the packing P, the transmission member 42 can be swingably connected to the reflector 14, with a relatively simple structure.

In the vehicle headlamp 3 according to the third embodiment, since the swingable guide protrusion 43 of a convex spherical shape is provided at the rear end of the boss 39 of the reflector 14, the transmission member 42 can smoothly swing with respect to the swingable guide protrusion 43 of a convex spherical shape of the boss 39, and hence optical axis adjustment can be carried out more smoothly.

In the first, second, and third embodiments, vehicle headlamps 1, 2, and 3, respectively having the ball joint 21, the lateral optical axis adjustment unit and the vertical optical axis adjustment unit 23 have been explained. However, this invention can be also applied to a vehicle headlamp having an optical axis adjustment mechanism comprising a ball joint and one optical axis adjustment unit.

In the first, second, and third embodiments, an example in which the present invention is applied to an integral type reflector 14 has been explained, in which the first reflector 14A and the second reflector 14B are provided integrally adjacent to each other, in multiple stages, back and front. The present invention, however, is applicable to an integral type reflector, in which a first reflector and a second reflector are provided integrally adjacent to each other, in laterally multiple stages, and to a simple integral type reflector, in which a first reflector and a second reflector are not provided integrally adjacent to each other, in multiple stages, and further to a reflector having a single reflector, not limited to the integral type reflector.

In the first, second, and third embodiments, an example in which the transmission member 26, 33 or 42 is provided in the vertical optical axis adjustment unit 23 has been explained. However, in this invention, the transmission member may be provided in the lateral optical axis adjustment unit, or provided in both of the lateral optical axis adjustment unit and the vertical optical axis adjustment unit.

In the first, second, and third embodiments, an example in which the front lens 12 is a slant-type front lens, largely inclined vertically and laterally, has been explained. This invention, however, is also applicable to an example of a general front lens, in which the front lens does not largely incline in either one or both of the vertical and lateral directions.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A vehicle headlamp comprising:
   a lamp chamber including a housing and a front lens;
   a lamp bulb housed in the lamp chamber;
   a reflector that reflects a light emitted by the lamp bulb in the direction of the front lens;
   an optical axis adjustment mechanism that supports the reflector on the housing so as to be able to adjust the optical axis, the optical axis adjustment mechanism having
      a ball joint that tiltably supports the reflector on the housing; and
      an optical axis adjustment unit that causes the reflector to tilt about a tilting fulcrum of the ball joint, the optical axis adjustment unit having
         an aiming screw rotatably supported on the housing, the aiming screw having a screw portion;
         a nut member fitted to the screw portion of the aiming screw, so as to be able to advance or retreat in the axial direction of the aiming screw; and
         a transmission member connected swingably to the reflector and the nut member about the axis substantially orthogonal to the tilting direction of the reflector and to the advancing and backward direction of the nut member, for converting the linear motion of the nut member into rotation motion to transmit the rotation motion to the reflector, and correcting an error between the linear motion of the nut member and the rotation motion of the reflector.

2. The vehicle headlamp according to claim 1, wherein an annular groove is formed in the nut member, about the aiming screw, and a hole is provided in the transmission member, so that the nut member fits into the hole via the annular groove, to swingably connect the nut member with the transmission member.

3. The vehicle headlamp according to claim 1, wherein a bracket is fixed on the reflector, and a rotation pivot is provided in the bracket, so that the bracket fits into the transmission member via the rotation pivot, to swingably connect the reflector with the transmission member.

4. The vehicle headlamp according to claim 1, wherein a bracket is fixed on the reflector, a rotational sliding guide groove is formed between the reflector and the bracket, and a sliding portion is provided in the transmission member, so that the sliding portion is mounted on the reflect and the bracket so as to be able to slide, via the rotational sliding guide groove, to swingably connect the reflector with the transmission member.

5. The vehicle headlamp according to claim 1, wherein a bracket is fixed on the reflector, an annular groove is formed between the reflector and the bracket, and a hole is provided in the transmission member, so that any one or both of the reflector and the bracket is fitted to the hole via the annular groove, to swingably connect the reflector with the transmission member.

6. The vehicle headlamp according to claim 1, wherein an annular groove is formed in the nut member, about the aiming screw,
   the transmission member comprises a mounting portion crossing the aiming screw, and a connecting portion substantially parallel to the aiming screw, a hole being provided in the mounting portion,
   the nut member is fitted in the hole in the mounting portion via the annular groove, so that the transmission member can swing in the tilting direction of the reflector, while the nut member does not rotate together th the aiming screw, to swingably connect the nut member with the transmission member, and
   a bracket is fixed on the reflector, a connecting portion substantially parallel to the aiming screw is provided in the bracket, and a rotation pivot is provided in the connecting portion,
   the connecting portion in the bracket of the reflector being fitted to the connecting portion of the transmission member via the rotation pivot, to swingably connect the reflector with the transmission member.

7. The vehicle headlamp according to claim 1, wherein an annular groove is formed in the nut member, about the aiming screw,
   the transmission member comprises a mounting portion crossing the aiming screw, a connecting portion substantially parallel to the aiming screw, and a dome-shaped sliding portion, a hole being provided in the mounting portion, the nut member is fitted in the hole in the mounting portion via the annular groove, so that the transmission member can swing in the tilting direction of the reflector, while the nut member does not rotate together with the aiming screw, to swingably connect the nut member with the transmission member, and a bracket is fixed on the reflector, and a concave spherical surface and a convex spherical surface are formed respectively on the opposing surfaces of the reflector and the bracket, and a rotational sliding guide groove is formed between the concave spherical surface and the convex spherical surface, the sliding portion of the transmission member being mounted between the concave spherical surface of the reflector and the convex spherical surface of the bracket via the rotational sliding guide groove so as to be able to slide, to swingably connect the reflector with the transmission member.

8. The vehicle headlamp according to claim 1, wherein an annular groove is formed in the nut member, about the aiming screw, the transmission member comprises a first mounting portion and a second mounting portion, respectively crossing the aiming screw, and a connecting portion substantially parallel to the aiming screw, a hole is respectively provided in the first mounting portion and the second mounting portion, the nut member is fitted in the hole in the first mounting portion via the annular groove, so that the transmission member can swing in the tilting direction of the reflector, while the nut member does not rotate together with the aiming screw, to swingably connect the nut member with the transmission member, and a bracket is fixed on the reflector, and a swingable guide protrusion in a convex spherical shape and a flat surface are formed on the opposing surfaces of the reflector and the bracket, and an annular groove is formed between the swingable guide protrusion and the flat surface, the bracket being fitted into the hole in the second mounting portion via the annular groove, the second mounting portion being swingably mounted between the swingable guide protrusion of the reflector and the flat surface of the bracket, and a resilient member being intervened between the swingably guide protrusion and the second mounting portion, to swingably connect the reflector with the transmission member.

9. A vehicle headlamp comprising:

a lamp chamber including a housing and a front lens;

a first lamp bulb and a second lamp bulb housed in the lamp chamber;

an integrated-type reflect having a first reflector that reflects a light emitted by the first lamp bulb in the direction of the front lens, and a second reflector that reflects a light emitted by the second lamp bulb the direction of the front lens;

an optical axis adjustment mechanism that supports the integrated-type reflector on the housing so as to be able to adjust the optical axis, the optical axis adjustment mechanism being arranged in the first reflector, the optical axis adjustment mechanism having
a ball joint that tiltably supports the integrated-type reflector on the housing; and an optical axis adjustment unit, arranged in the second reflector, that causes the integrated-type reflector to tilt about a tilting fulcrum of the ball joint, the optical axis adjustment unit having
an aiming screw rotatably supported on the housing, the aiming screw having a screw portion;
a nut member fitted to the screw portion of the aiming screw, so as to be able to advance or retreat in the axial direction of the aiming screw; and
a transmission member connected swingably to the integrated-type reflector and the nut member about the axis substantially orthogonal to the tilting direction of the integrated-type reflector and to the advancing and backward direction of the nut member, for converting the linear motion of the nut member into rotation motion to transmit the rotation motion to the integrated-type reflector, and correcting an error between the linear motion of the nut member and the rotation motion of the integrated-type reflector.

10. The vehicle headlamp according to claim 9, wherein an annular groove is formed in the nut member, about the aiming screw, and a hole is provided in the transmission member, so that the nut member fits into the hole via the annular groove, to swingably connect the nut member with the transmission member.

11. The vehicle headlamp according to claim 9, wherein a bracket is fixed on the integrated-type reflector, and a rotation pivot is provided in the bracket, so that the bracket fits into the transmission member via the rotation pivot, to swingably connect the integrated-type reflector with the transmission member.

12. The vehicle headlamp according to claim 9, wherein a bracket is fixed on the integrated-type reflector, a rotational sliding guide groove is formed between the integrated-type reflector and the bracket, and a sliding portion is provided in the transmission member, so that the sliding portion is mounted on the integrated-type reflector and the bracket so as to be able to slide, via the rotational sliding guide groove, to swingably connect the integrated-type reflector with the transmission member.

13. The vehicle headlamp according to claim 9, wherein a bracket is fixed on the integrated-type reflector, an annular groove is formed between the integrated-type reflector and the bracket, and a hole is provided in the transmission member, so that any one or both of the integrated-type reflector and the bracket is fitted to the hole via the annular groove, to swingably connect the integrated-type reflector with the transmission member.

14. The vehicle headlamp according to claim 9, wherein an annular groove is formed in the nut member, about the aiming screw, the transmission member comprises a mounting portion crossing the aiming screw, and a connecting portion substantially parallel to the aiming screw, a hole being provided in the mounting portion, the nut member is fitted in the hole in the mounting portion via the annular groove, so that the transmission member can swing in the tilting direction of the integrated-type reflector, while the nut member does not rotate together with the aiming screw, to swingably connect the nut member with the transmission member, and a bracket is fixed on the integrated-type reflector, a connecting portion substantially parallel to the aiming screw is provided in the bracket, and a rotation pivot is provided in the connecting portion, the connecting portion in bracket of the integrated-type reflector being fitted to the connecting portion of the transmission member via the rotation pivot, to swingably connect the integrated-type reflector with the transmission member.

15. The vehicle headlamp according to claim 9, wherein an annular groove is formed in the nut member, about the aiming screw, the transmission member comprises a mounting portion crossing the aiming screw, a connecting portion substantially parallel to the aiming screw, and a dome-shaped sliding portion, a hole being provided in mounting portion, the nut member is fitted in the hole in the mounting portion via the annular groove, so that the transmission member can swing in the tilting direction of the integrated-type reflector, while the nut member does not rotate together with the aiming screw, to swingably connect the nut member with the transmission member, and a bracket is fixed on the integrated-type reflector, and a concave spherical surface and a convex spherical surface are formed respectively on the opposing surfaces of the integrated-type reflector and the bracket, and a rotational sliding guide groove is formed between the concave spherical surface and the convex spherical surface, the dome-shaped sliding portion of the transmission member being mounted between the concave spherical surface of the integrated-type reflector and the convex spherical surface of the bracket via the rotational sliding guide groove so as to be able to slide, to swingably connect the integrated-type reflector with the transmission member.

16. The vehicle headlamp according to claim 9, wherein an annular groove is formed in the nut member, about the aiming screw, the transmission member comprises a first mounting portion and a second mounting portion, respectively crossing the aiming screw, and a connecting portion substantially parallel to the aiming screw, a hole is respectively provided in the first mounting portion and the second mounting portion, the nut member is fitted in the hole in the first mounting portion via the annular groove, so that the transmission member can swing in the tilting direction of the integrated-type reflector, while the nut member does not rotate together with the aiming screw, to swingably connect the nut member with the transmission member, and a bracket is fixed on the integrated-type reflector, and a swingable guide protrusion in a convex spherical shape and a flat surface are formed on the opposing surfaces of the integrated-type reflector and the bracket, and an annular groove is formed between the swingable guide protrusion and the flat surface, the bracket being fitted into the hole in the second mounting portion via the annular groove, the second mounting portion being swingably mounted between the swingable guide protrusion of the integrated-type reflector and the flat surface of the bracket, and a resilient member being intervened between the swingable guide protrusion and the second mounting portion, to swingably connect the integrated-type reflector with the transmission member.

17. A vehicle headlamp comprising:

a lamp chamber including a housing and a front lens, the front lens is a slant type front lens largely inclined in either one or both of the vertical and lateral directions;

a first lamp bulb and a second lamp bulb housed in the lamp chamber;

an integrated-type reflector having a first reflector that reflects a light emitted by the first lamp bulb in the direction of the front lens, and a second reflector that reflects a light emitted by the second lamp bulb in the direction of the front lens;

an optical axis adjustment mechanism that supports the integrated-type reflector on the housing so as to be able to adjust the optical axis, the optical axis adjustment mechanism having a ball joint arranged in the first reflector and that tiltably supports the integrated-type reflector on the housing; and any one or both of a vertical optical axis adjustment unit arranged in the second reflector and that causes the integrated-type reflector to tilt vertically about a tilting fulcrum of the ball joint, and a lateral optical axis adjustment unit that causes the integrated-type reflector to tilt laterally about a tilting fulcrum of the ball joint, the vertical optical axis adjustment unit and the lateral optical axis adjustment unit being arranged in the second reflector, the optical axis adjustment unit having an aiming screw rotatably supported on the housing, the aiming screw having a screw portion;

a nut member fitted to the screw portion of the aiming screw, so as to be able to advance or retreat in the axial direction of the aiming screw; and a transmission member respectively connected swingably to the integrated-type reflector and the nut member about the axis substantially orthogonal to the tilting direction of the integrated-type reflector and to the advancing and backward direction of the nut member, for converting the linear motion of the nut member into rotation motion to transmit the rotation motion to the integrated-type reflector, and correcting an error between the linear motion of the nut member and the rotation motion of the integrated-type reflector.

18. The vehicle headlamp according to claim 17, wherein an annular groove is formed in the nut member, about the aiming screw, and a hole is provided in the transmission member, so that the nut member fits into the hole via the annular groove, to swingably connect the nut member with the transmission member.

19. The vehicle headlamp according to claim 17, wherein a bracket is fixed on the integrated-type reflector, and a rotation pivot is provided in the bracket, so that the bracket fits into the transmission member via the rotation pivot, to swingably connect the integrated-type reflector with the transmission member.

20. The vehicle headlamp according to claim 17, wherein a bracket is fixed on the integrated-type reflector, a rotational sliding guide groove is formed between the integrated-type reflector and the bracket, and a sliding portion is provided in the transmission member, so that the sliding portion is mounted on the integrated-type reflector and the bracket so as to be able to slide, via the rotational sliding guide groove, to swingably connect the integrated-type reflector with the transmission member.

21. The vehicle headlamp according to claim 17, wherein a bracket is fixed on the integrated-type reflector, an annular groove is formed between the integrated-type reflector and the bracket, and a hole is provided in the transmission member, so that any one or both of the integrated-type reflector and the bracket is fitted to the hole via the annular groove, to swingably connect the integrated-type reflector with the transmission member.

22. The vehicle headlamp according to claim 17, wherein an annular groove is formed in the nut member, about the aiming screw, the transmission member comprises a mounting portion crossing the aiming screw, and a connecting portion substantially parallel to the aiming screw, a hole being provided in the mounting portion, the nut member is fitted in the hole in the mounting portion via the annular groove, so that the transmission member can swing in the tilting direction of the integrated-type reflector, while the nut member does not rotate together with the aiming screw, to swingably connect the nut member with the transmission member, and a bracket is fixed on the integrated-type reflector, a second connecting portion substantially parallel to the aiming screw is provided in the bracket, and a rotation pivot is provided in the second connecting portion, the second connecting portion in the bracket of the integrated-type reflector being fitted to the connecting portion of the transmission member via the rotation pivot, to swingably connect the integrated-type reflector with the transmission member.

23. The vehicle headlamp according to claim 17, wherein an annular groove is formed in the nut member, about the aiming screw, the transmission member comprises a mounting portion crossing the aiming screw, a connecting portion substantially parallel to the aiming screw, and a dome-shaped sliding portion, a hole being provided in the mounting portion, the nut member is fitted in the hole in the mounting portion via the annular groove, so that the transmission member can swing in the tilting direction of the integrated-type reflector, while the nut member does not rotate together with the aiming screw, to swingably connect the nut member with the transmission member, and a bracket is fixed on the integrated-type reflector, and a concave spherical surface and a convex spherical surface are formed respectively on the opposing surfaces of the integrated-type reflector and the bracket, and a rotational sliding guide groove is formed between the concave spherical surface and the convex spherical surface, the sliding portion of the transmission member being mounted between the concave spherical surface of the integrated-type reflector and the convex spherical surface of the bracket via the rotational sliding guide groove so as to be able to slide, to swingably connect the integrated-type reflector with the transmission member.

24. The vehicle headlamp according to claim 17, wherein an annular groove is formed in the nut member, about the aiming screw, the transmission member comprises a first mounting portion and a second mounting portion, respectively crossing the aiming screw, and a connecting portion substantially parallel to the aiming screw, a hole is respectively provided in the first mounting portion and the second mounting portion, the nut member is fitted in the hole in the first mounting portion via the annular groove, so that the transmission member can swing in the tilting direction of the integrated-type reflector, while the nut member does not rotate together with the aiming screw, to swingably connect the nut member with the transmission member, and a bracket is fixed on the integrated-type reflector, and a swingable guide protrusion in a convex spherical shape and a flat surface are formed on the opposing surfaces of the integrated-type reflector and the bracket, and a second annular groove is formed between the swingable guide protrusion and the flat surface, the bracket being fitted into the hole in the second mounting portion via the second annular groove, the second mounting portion being swingably mounted between the swingable guide protrusion of the integrated-type reflector and the flat surface of the bracket, and a resilient member being intervened between the swingable guide protrusion and the second mounting portion, to swingably connect the integrated-type reflector with the transmission member.

* * * * *